(12) United States Patent
O'Connell et al.

(10) Patent No.: US 7,536,679 B1
(45) Date of Patent: May 19, 2009

(54) SYSTEM AND METHODS FOR TEST TOOL CLASS INHERITANCE

(75) Inventors: Ryan S. O'Connell, Chester, NH (US);
Kyle T. Grucci, Southwick, MA (US);
Kevin G. Osborn, Newton, MA (US);
Ryan K. Lubke, Rindge, NH (US);
Lance J. Andersen, Boxborough, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1010 days.

(21) Appl. No.: 10/920,947

(22) Filed: Aug. 18, 2004

(51) Int. Cl.
*G06F 9/44* (2006.01)
*G06F 9/45* (2006.01)

(52) U.S. Cl. .................. 717/126; 717/127; 717/131; 717/148; 714/38; 714/39

(58) Field of Classification Search .................. None
See application file for complete search history.

(56) References Cited

U.S. PATENT DOCUMENTS 6,651,186 B1 * 11/2003 Schwabe .................. 714/38

* cited by examiner

*Primary Examiner*—Chuck O Kendall
(74) *Attorney, Agent, or Firm*—Brooks Kushman, P.C.

(57) ABSTRACT

A software compliance test is typically directed only at particular classes in the inheritance hierarchy. Inherited APIs (classes), which are not the focus of the test, may cause the application under test (AUT) to fail the compliance test since some of the underlying classes differ from a reference implementation. Accordingly, a verification tool employs the same version and implementation of inherited APIs in the reference implementation of these inherited APIs as the application under test. A dynamic class loader examines class inheritance references made by the application under test to determine if the class is included in the API to be tested, or if the class is outside the scope of the API to be tested. If the class corresponds to the API to be tested, then the dynamic loader uses the reference implementation of the API for comparison. Otherwise, the reference implementation employs the same inherited class references as the application under test. Therefore, for the underlying inherited or secondary class references, the dynamic loader employs the same classes in the reference implementation as the AUT inherits.

32 Claims, 7 Drawing Sheets

SYSTEM AND METHODS FOR TEST TOOL CLASS INHERITANCE

BACKGROUND

Conventional software development systems employ a variety of source languages and operate on a variety of operating systems. For example, software applications are typically written in languages such as Java, C++ and HTML, to name some of the more common. Further, different computer systems execute different operating systems, such as Windows, Unix, Linux, and associated extensions/revisions, such as Windows 95/98/NT/XP etc. In short, a multitude of operating environments are available in which to operate (execute) a software application, and selecting and tailoring particular applications to available environments raises compatibility, engineering, marketing and feasibility issues.

For some time, it has been a goal of software developers to design applications which operate on different operating systems. For example, the Java language, developed by Sun Microsystems Inc. of Santa Clara, Calif. is compatible with a number of different operating systems. A Java based application, therefore, is adapted to run on a plurality of different computers under the control of different operating systems. Further, Java is compatible at the object code level, meaning that applications typically need not be recompiled from source code into executable or object code in order to run on alternate platforms.

Accordingly, it is desirable for software vendors to develop applications in a multi-platform environment such as Java to provide the ability to execute the resulting applications on multiple operating systems. However, multi-platform capability generally requires adherence to a particular interface, or set of requirements, in order to provide cross-platform operation. Applications which are non-compliant with a particular multi-platform specification may not operate correctly or effectively on each purported platform.

SUMMARY

In a conventional software development environment, software applications are often tested for compliance with a particular standard or for operation on a particular platform. In a Java based software application, compliance with the Java language is particularly desirable because a Java compliant application is compatible with multiple platforms. Typically, conventional compatibility testing is performed by a testing suite, which examines the interface of an Application Under Test (AUT) with a reference interface (RI) to determine if the Application Programming Interface (APT) of the AUT matches the reference implementation interface. In a multiple platform language such as Java, such compatibility testing may be performed by a Java Compatibility Test Suite.

As indicated above, software applications may employ multiple languages, platforms, and revisions of various elements of the application. Typically, these elements are organized into classes, which depend on other classes, typically forming a hierarchy or graph of dependencies, as is known by those of skill in the art. Such dependencies between classes are typically referred to as inheritance of one class by another class. Accordingly, the interfaces representing both the application under test and the reference implementation draw from an inheritance chain of classes.

In the inheritance chain, there may be several major APIs, or interfaces to groupings of classes, each corresponding to a particular library, product or revision. For example, the Java 2 Enterprise Edition (J2EE) builds on the Standard Edition (SE) Java library.

Typically, a compatibility test suite contains a signature test which targets a particular API in the inheritance chain, such as a J2EE compatibility or compliance test suite. However, a conventional test suite examines the entire interface, therefore including all classes in the inheritance chain, since inherited classes may be referenced from anywhere within the inheritance hierarchy, thus such API references may be nested within other methods or classes. Accordingly, a conventional test verifies all API calls, or references, in the application under test against the reference implementation interface. Such a test, therefore, includes both the particular API targeted by the test, such as the J2EE calls, and calls or references made directly or indirectly to other objects.

APIs and other software entities typically inherit classes of software objects. The pattern of inheritance results in an inheritance hierarchy, often expressed as a graph, which indicates dependencies of the software object on other software objects. In order to properly scan an API definition, the inheritance hierarchy is also traversed to verify method invocations nested in the hierarchy. Therefore, the class of objects in the API under test depends upon other classes via the inheritance hierarchy. However, the other dependency classes may have multiple versions or undergo revisions from time to time. An API under test evaluated against a reference implementation version which does not employ the same underlying (inherited) classes will evaluate as incompatible, due to the differences in the underlying classes, even though the differences are not in the API under test and may in fact be functionally correct.

However, such inherited or indirect APIs, which are not the focus of the test, are subject to the dynamic revision and release issues discussed above. Accordingly, configurations of the invention are based, in part, on the observation that interface changes or revisions to the inherited APIs, while fully compliant and operational with respect to the application under test, can cause the application under test to fail the signature compatibility test since some of the underlying classes, and references thereto, are different than the reference implementation.

Therefore, if classes in the inheritance chain are revised or modified, the compliance test may indicate incompatibility, even if such classes are not part of the API implementation to be tested, because the revised classes do not match the reference implementation interface. In other words, if a J2EE application is built using a different Java SE edition than the J2SE edition employed in the reference implementation, differences between the SE versions may cause the compliance test to fail event though the API of the AUT represents a valid J2EE application, because it employs a different, yet valid, underlying SE version.

Accordingly, configuration of the inventions substantially overcome the shortcomings discussed above with respect to inheritance of revised classes by employing the same version of the inherited secondary or indirect APIs in the reference implementation interface as used by the application under test. A dynamic class loader examines class inheritance during test execution. The dynamic loader examines each class reference made by the application under test to determine if the class is included in the API to be tested, or if the class corresponds to secondary inherited classes outside the scope of the API to be tested. If the class from the AUT corresponds to the API to be tested, then the dynamic loader uses the reference implementation of the API (such as the reference J2EE interface) for comparison. Otherwise, the dynamic loader employs a system class loader representing the same inherited, or system, class references as the reference implementation. Since the inherited classes are loaded by the system class loader, the inherited classes can be the same version used for both the RI and the 3rd party implementation, such that they are the same during the test run. Therefore, for the underlying inherited or secondary class references, the dynamic loader employs the same classes in the reference implementation as the AUT.

In particular configurations, the classes are represented by signatures corresponding to methods included in the class. The signatures are extracted and compared from both the reference implementation and the application under test. Such signatures are represented as API lists for both the RI and AUT before comparison. A specialized custom class loader includes a class loader to load RI classes and a class loader that loads 3rd party (AUT) classes, which both share a parent class loader to load the inherited/referenced classes outside the API under test. Generation of the signature/API lists presumes that each class in the RI exists in the 3rd party, which is reflected to determine the methods declared in that class. The inheritance hierarchy of the class is then recursively processed.

Each ancestor class is reflected to acquire the APIs inherited by the child class. During the process of recursively cataloging the methods inherited from ancestor classes the inheritance hierarchy will cross into classes that are part of the base/reference/inherited API and are not part of the API being tested. At this point the classes outside the API under test will be loaded by the shared parent class loader. Once this process occurs for the RI and the AUT then the signature verifier can compare the gathered APIs.

In further detail, the method for verifying application interface compliance includes identifying classes corresponding to a reference implementation, in which the classes are adapted for inheritance relationships with other classes, as in an object oriented development environment. The method identifies reference classes from the identified classes indicative of a base API for verification. The base API is deterministic of a compliant third party interface, in which the remaining identified classes are inherited classes outside of the API being tested. A signature generator generates a reference implementation artifact indicative of the reference implementation of an interface, and further generates an application artifact indicative of a third party application interface under test (AUT). A signature verifier determines if a signature reference, such as a method invocation (i.e. call into the API), in the application artifact corresponds to the base API for verification and, if so, compares the application artifact to the reference implementation artifact by matching the application artifact to the identified reference classes to verify correct invocation of the classes and methods in the application under test, and, if not, compares the application artifact to the identified inherited classes.

Comparing further includes comparing classes inherited by the application interface under test with corresponding inherited classes in the reference implementation. The compared signature reference is an object invocation from a particular class to another class, such as a method call to a method or function in the application under test, wherein the signature is a code fragment (i.e. method name and parameters) representing the invocation call. In particular configuration, the signature may be a routine or method header easily extracted by parsing source code, such as by parsing the first line of code (i.e. code fragment) from the method source.

In exemplary arrangements, the artifact may therefore be a set of signatures, in which each of the signatures corresponding to a method, wherein matching includes verifying each signature in the application artifact to a corresponding signature from the reference implementation artifact. The verification tool concludes that the application (AUT) is compliant if each signature in the application correlates to a signature in the reference implementation (RI). Such signature matching, often performed by a process known as reflection, is an efficient comparison mechanism and may be performed on the extracted header text, typically lines of text including the method name and parameters, from source code.

In particular configurations, generating the reference implementation artifact and the application artifact further includes defining a reference inheritance chain from the reference implementation, and defining an AUT reference chain, wherein the reference inheritance chain and the AUT reference chain include corresponding classes in the inheritance chain. The inheritance chain, as defined by conventional hierarchical class inheritance dependencies, may identify successive or different versions of inherited classes employed by the AUT and the RI. The signature generator, by employing the custom class loader, employs the same versions of inherited classes in the reference implementation and the application under test (i.e. third party application) interface. Employing the same inherited classes ensures that alternate and/or equivalent versions which may differ in insubstantial respects do not falsely indicate an AUT interface as noncompliant.

In particular configurations discussed further below, comparing further includes, for each reference in the application interface under test, identifying if the reference corresponds to the base API for verification, and selectively ensuring that the matching occurs with the same inherited class in the base API for verification.

Each reference is a method invocation corresponding to a signature in the artifact.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or Field Programmable Gate Array (FPGA). The software or firmware or other such configurations can be installed onto the computerized device (e.g., during operating system for execution environment installation) to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, processors, and computer program products and/or software applications such as operating system's and execution environments such as the Java Virtual Machine manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Modern software systems may typically exhibit a complex pattern of inheritance. The pattern of inheritance results in an inheritance hierarchy, often expressed as a graph, which indicates dependencies of the software object on other software objects. Often, a compliance or validation test is directed only at particular classes in the inheritance hierarchy. In order to properly test such an API, the inheritance hierarchy is also traversed to verify method invocations nested in the hierarchy. Therefore, the class of objects in the API under test depends upon other classes via the inheritance hierarchy. However, the other dependency classes may have multiple versions or undergo revisions from time to time. An API under test evaluated against a reference implementation version which does not employ the same underlying (inherited) classes will evaluate as incompatible, due to the differences in the underlying classes, even though the differences are not in the API under test and may in fact be functionally correct.

Therefore, such inherited or indirect APIs, which are not the focus of the test, while fully compliant and operational with respect to the application under test, can cause the application under test to fail the compliance test since some of the underlying classes, and references thereto, are different than the reference implementation. Accordingly, if classes in the inheritance chain are revised or modified, the compliance test may indicate incompatibility, even if such classes are not part of the API implementation to be tested, because the revised classes do not match the reference implementation interface. Accordingly, configuration of the inventions perform compliance and validation testing by employing the same version of the inherited secondary or indirect APIs in the reference implementation interface as used by the application under test. A dynamic class loader examines class inheritance during test execution. The dynamic loader examines each class reference made by the application under test to determine if the class is included in the API to be tested, or if the class corresponds to secondary inherited classes outside the scope of the API to be tested. If the class from the AUT corresponds to the API to be tested, then the dynamic loader uses the reference implementation of the API (such as the reference J2EE interface) for comparison. Otherwise, the dynamic loader employs a system class loader representing the same inherited, or system, class references as the reference implementation. Therefore, for the underlying inherited or secondary class references, the dynamic loader employs the same classes in the reference implementation as the AUT inherits.

Figure 1:
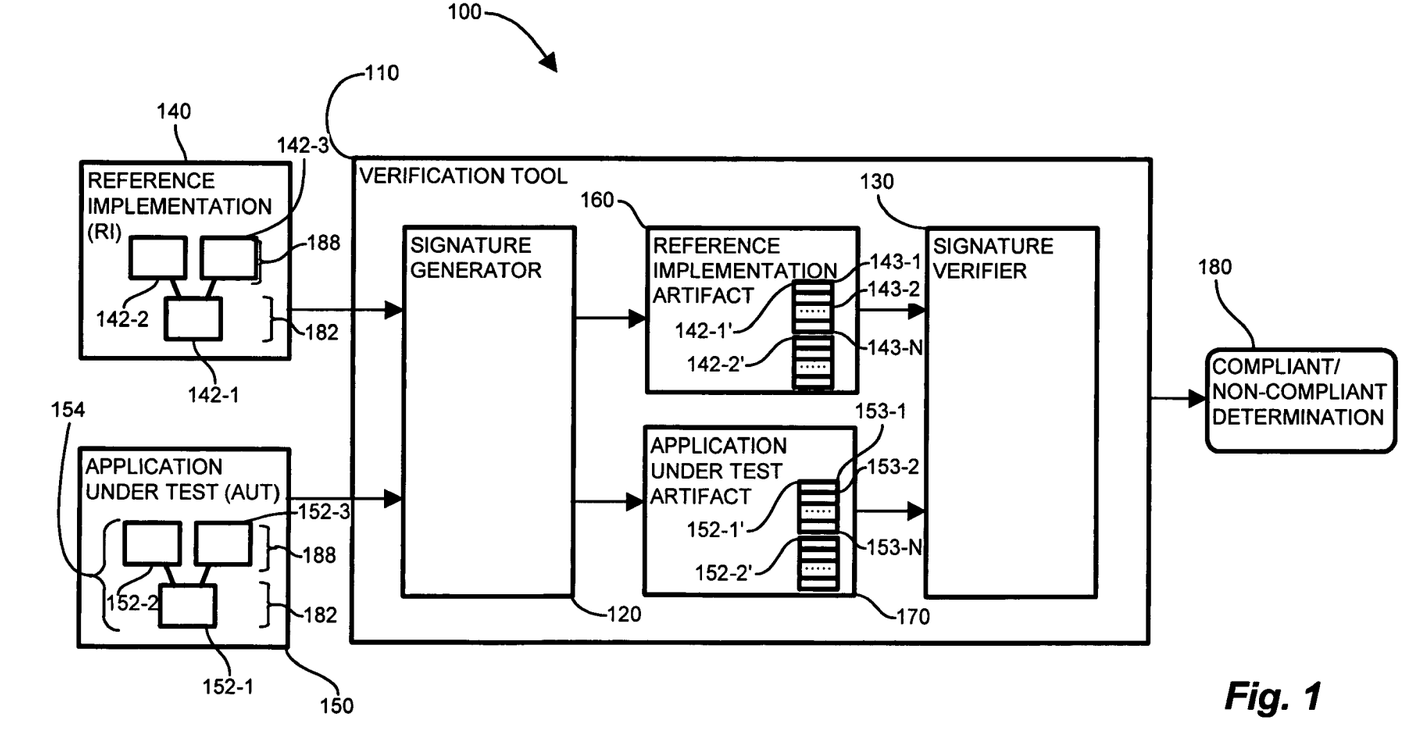
FIG. 1 is context diagram of the verification tool operable for class inheritance according to principles of the invention.

FIG. 1 is context diagram of the verification tool operable for class inheritance according to principles of the invention. Referring to FIG. 1, a development environment 100 includes the verification tool 110, which in particular configurations may be a suite of tools or applications for testing software compliance against a predetermined standard. The verification tool 110 includes a signature generator 120 and a signature verifier 130. The signature generator receives both a reference implementation (RI) 140 of the interface against which compliance is checked, and an application under test (AUT) 150 to be tested for compliance with the reference implementation 140. The application under test 150 includes a plurality of classes 152-1 . . . 152-3 (152 generally) defining an inheritance hierarchy 154. The illustrated hierarchy 154 is exemplary; alternate forms of inherited classes 182 may be inherited by application under test classes 188, including via such vehicles as multiple inheritance, in alternate configurations.

In operation, the signature generator 120 receives both the reference implementation 140 and the application under test 150 and generates a reference implementation artifact 160 and an application under test artifact 170, respectively. In the exemplary configuration, the artifacts 160, 170 include classes 142-1' . . . 142-N', 152-1' . . . 152-N', each including signatures 143-1 . . . 143-N, 153-1 . . . 153-N, respectively indicative of references, or method invocations, which identify the name and parameters of each method referenced by the AUT 150 and the expected name and parameters defined by the RI 140. The signatures may be derived from the application programming interface (API) of the AUT 150 and RI 140, respectively, or in alternate configurations, other analysis mechanisms may be employed, discussed further below. The signature verifier 130 compares the application under test artifact 170 to the reference implementation artifact 160, and computes a compliance determination 180 indicative of compliance of the application under test 150 with the trusted reference version, such as a J2EE implementation, by insuring that each signature 153-N (i.e. method reference) in the application under test 150 matches the corresponding signature 143-N in the reference implementation 140.

Figure 2:
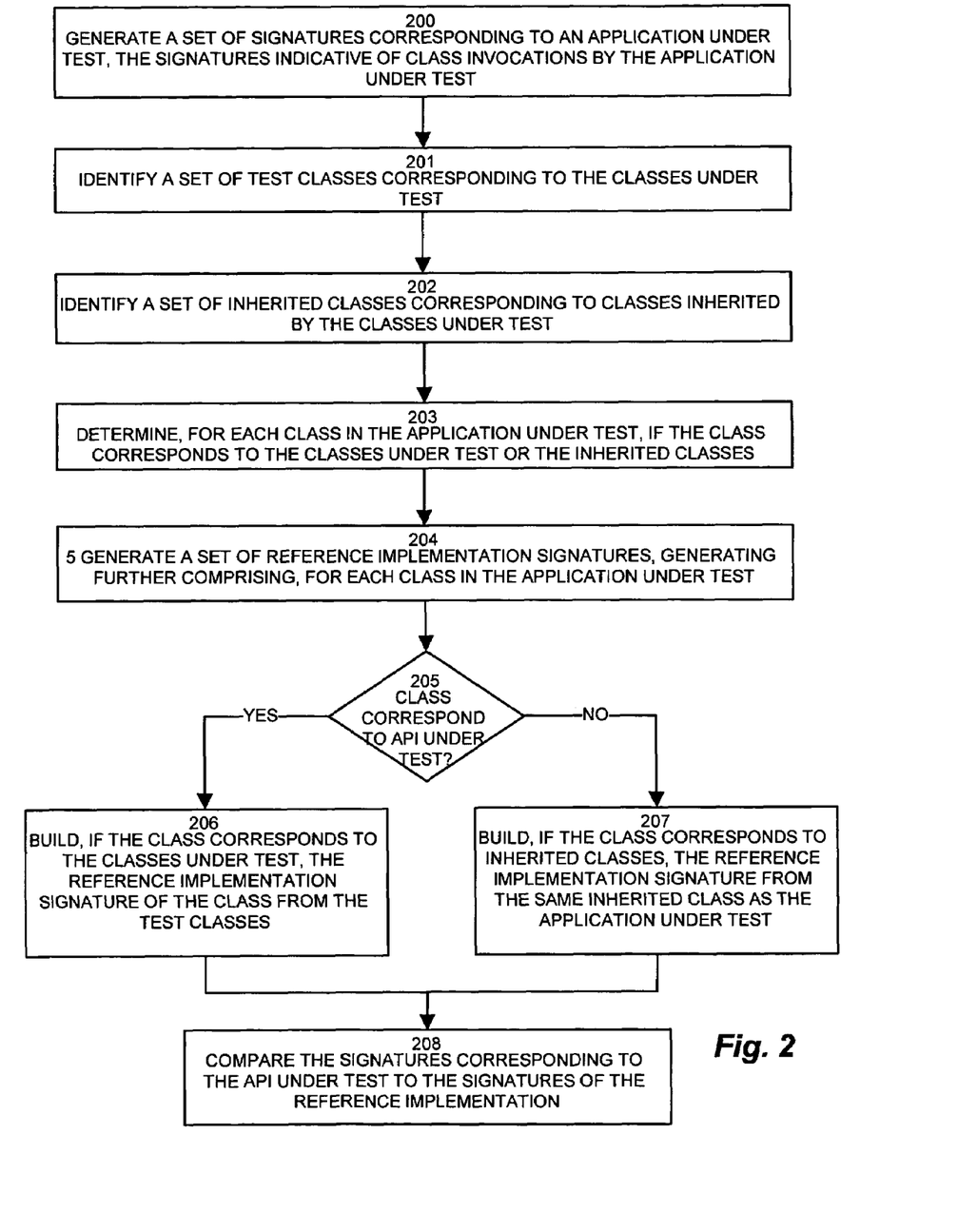
FIG. 2 is a flowchart of operation of the verification tool of FIG. 1.

FIG. 2 is a flowchart of operation of the verification tool of FIG. 1. Referring to FIGS. 1 and 2, the method for test suite class inheritance includes generating a set of signatures (e.g. artifact) 170 corresponding to an application under test 150, in which the signatures are indicative of class invocations by the application under test 150, as depicted at step 200. In the exemplary arrangement, the signatures identify method names and parameters, discussed further below, to allow verification of proper calls (invocations) of the methods. Accordingly, the signature generator 120 identifies a set of test classes corresponding to the classes under test 188, as shown at step 201. The signature generator 120 also identifies a set of inherited classes 182 corresponding to classes inherited by the classes under test 188, as shown at step 202. The inherited classes generally are not the subject of the test, but are included as part of the calling sequence to provide a complete definition of class and method nesting, and may be required for test integrity or other consistency issues.

The signature generator determines, for each class 152 in the application under test 150, if the class 152 corresponds to the classes under test 188 or the inherited classes 182, as depicted at step 203 and discussed further below. The signature generator 120 generates a set of reference implementation signatures 143, as shown at step 204 in which generating further comprises, for each class 152 in the application under test 150, performing a check to determine if the class 152 corresponds to API under test 188, as disclosed at step 205.

If the class 152 corresponds to the classes under test 188, then the signature generator 120 builds the reference implementation signatures 143 of the class 142-N as the reference implementation artifact 160 from the test classes 152, as shown at step 206. Otherwise, if the class 142-N corresponds to inherited classes 182, then the signature generator 120 builds the reference implementation signature 143 of the reference implementation artifact 160 from the same inherited class 182 as the application under test 150. The signature verifier 130 then compares the signatures 153-N (e.g. artifacts) corresponding to the API under test 170 to the signatures 143-N of the reference implementation 160.

Figure 3:
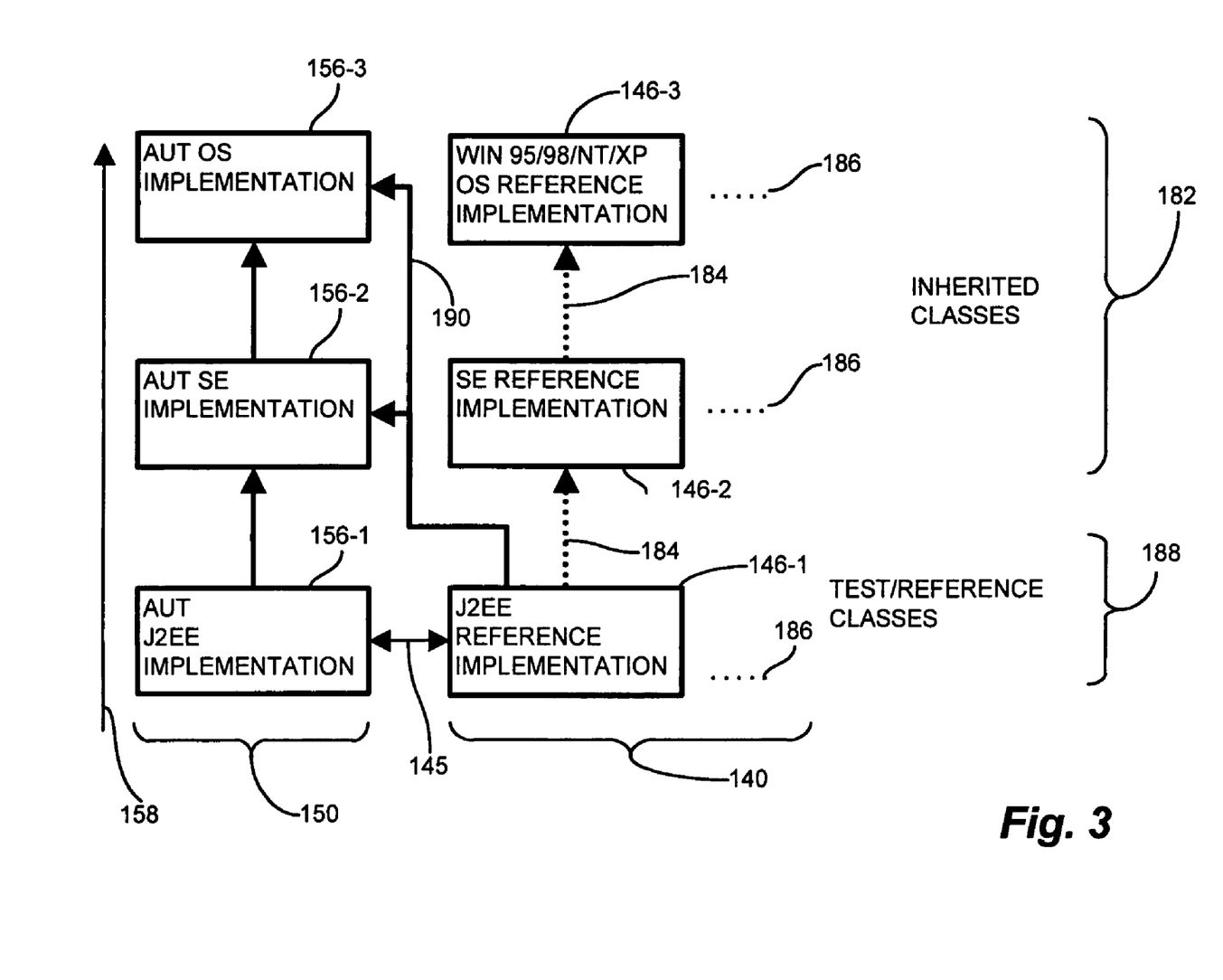
FIG. 3 is a block diagram of class inheritance employing the verification tool of FIG. 1.

FIG. 3 is a block diagram of class inheritance employing the verification tool 110 of FIG. 1. Referring to FIGS. 1 and 3, the application under test 150 includes one or more APIs 156-1.156-3, each of which may include one or more classes 152. Generally, classes 152 in a particular API 156 inherit classes 152 in another API 156 according to the inheritance hierarchy 154, shown by arrow 158. In the exemplary configuration shown, the application under test 150 implements a Java 2 Enterprise Edition (J2EE) API 156-1, which inherits (i.e. depends on) a Java Standard Edition (SE) API 156-2, which in turn depends on the underlying Operating System (OS) API 156-3, collectively included as inherited APIs 182. The exemplary inheritance progression 158 is illustrative, and may actually include many more APIs defining the inheritance hierarchy 154.

The verification tool 110 compares the Application Under Test 150 against the reference implementation 140, which also follows the inheritance hierarchy 158 consisting of the J2EE API, an SE API, and an OS API, collectively shown as a plurality of APIs 146-1 . . . 146-3. Additional inherited classes 146-N may be included, as shown by dotted lines 186.

In the exemplary configuration shown, compliance of the AUT J2EE implementation 156-1 against the J2EE reference implementation 146-1 is the subject of the testing performed by the verification tool 110, as shown by double arrow 145. The J2EE compliance test is not targeting the inherited Java Standard (SE) APIs 146-2, 146-3 or OS compliance with APIs 146-4 . . . 146-7, shown by dotted lines 184. Further, other versions of APIs may also be viable candidates, as indicated by the dotted lines 186. Therefore, the verification tool 110 is intended to examine the J2EE APIs 188 as test classes. Accordingly, the signature generator 120 determines and employs the same inherited APIs 182, specifically the AUT SE implementation 156-2 and the AUT OS implementation 156-3, shown by solid arrows 190, as will now be discussed in further detail.

Figure 4:
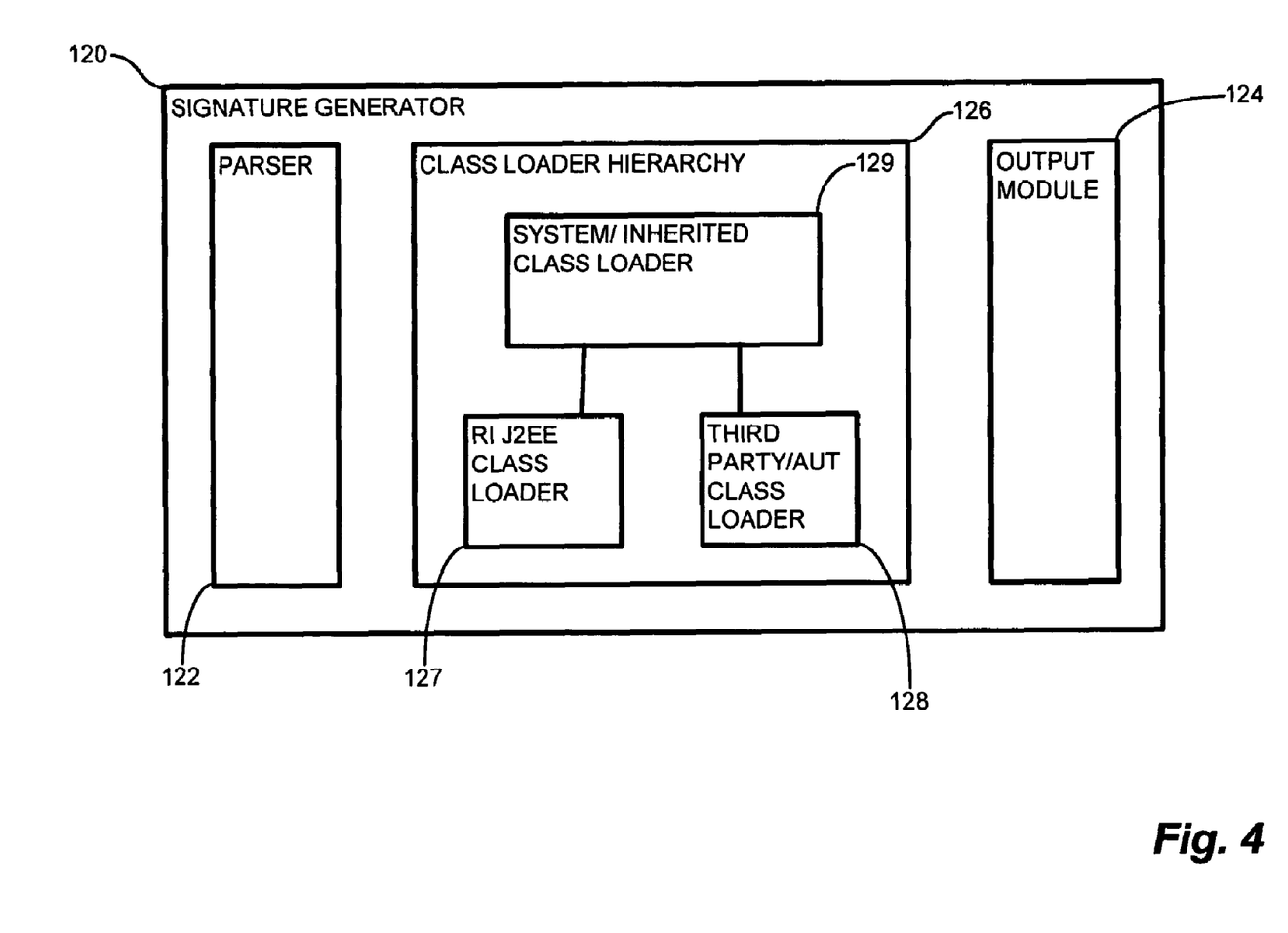
FIG. 4 is a block diagram of the signature generator in the verification tool of FIG. 1 in greater detail.

FIG. 4 is a block diagram of the signature generator in the verification tool of FIG. 1 in greater detail. Referring to FIGS. 1, 3 and 4, the signature generator 120 includes a parser 122, an output module 124, and a class loader hierarchy 126. The parser is operable to parse, or scan, the application under test 150 and the reference implementation 140, typically by parsing for method headers or entry points in the source code. Alternative configurations may parse object code or other form of compiled or processed code. The output module 126 is operable to write the artifact 160, 170 indicative of the parsed method invocations, typically as a set of signatures having the name and parameters of each of the methods. The class loader hierarchy 126 is operable to traverse the nested classes referenced from the parsed source code and retrieve the inherited classes and methods for further parsing.

In the exemplary configuration described, the class loader hierarchy 126 further includes a J2EE class loader 127, an AUT class loader 128, and a system/inherited class loader 129. The RI J2EE class loader 127 loads reference implementation test classes 188 from the reference implementation 140. The AUT class loader 128 loads test classes 188 from the application under test 150 (i.e. third party application), and the system/inherited class loader 129 loads inherited classes 182 invoked from either the J2EE test classes 142-1 or the AUT test classes 152-1, thereby assuring that inherited references 182 which are not part of the test compliance/non-compliance determination 180 are performed from the same API, or set of classes 182.

Figure 5:
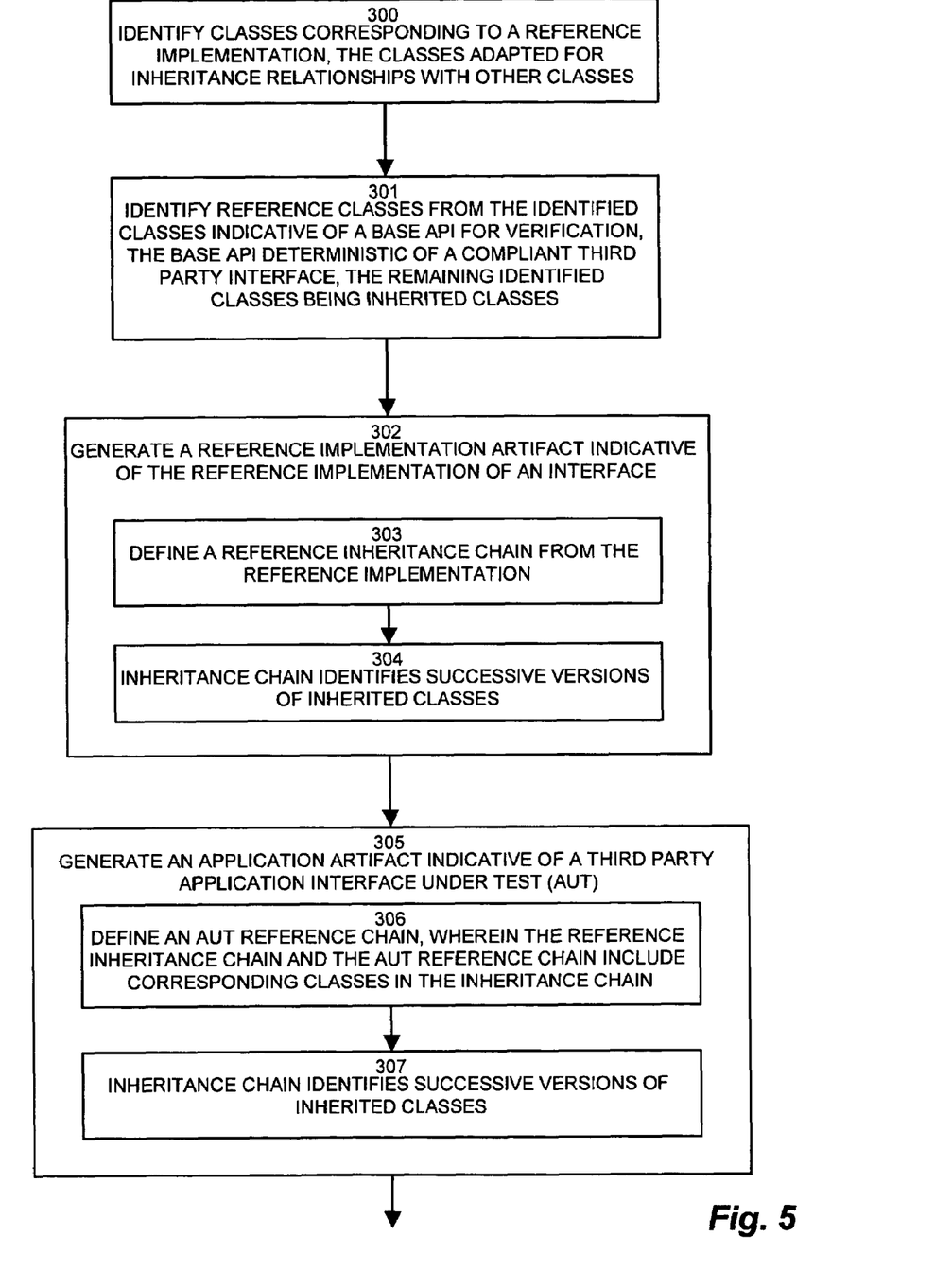
FIGS. 5-7 are a flowchart of operation of the verification tool of FIG. 1 in greater detail.
Figure 6:
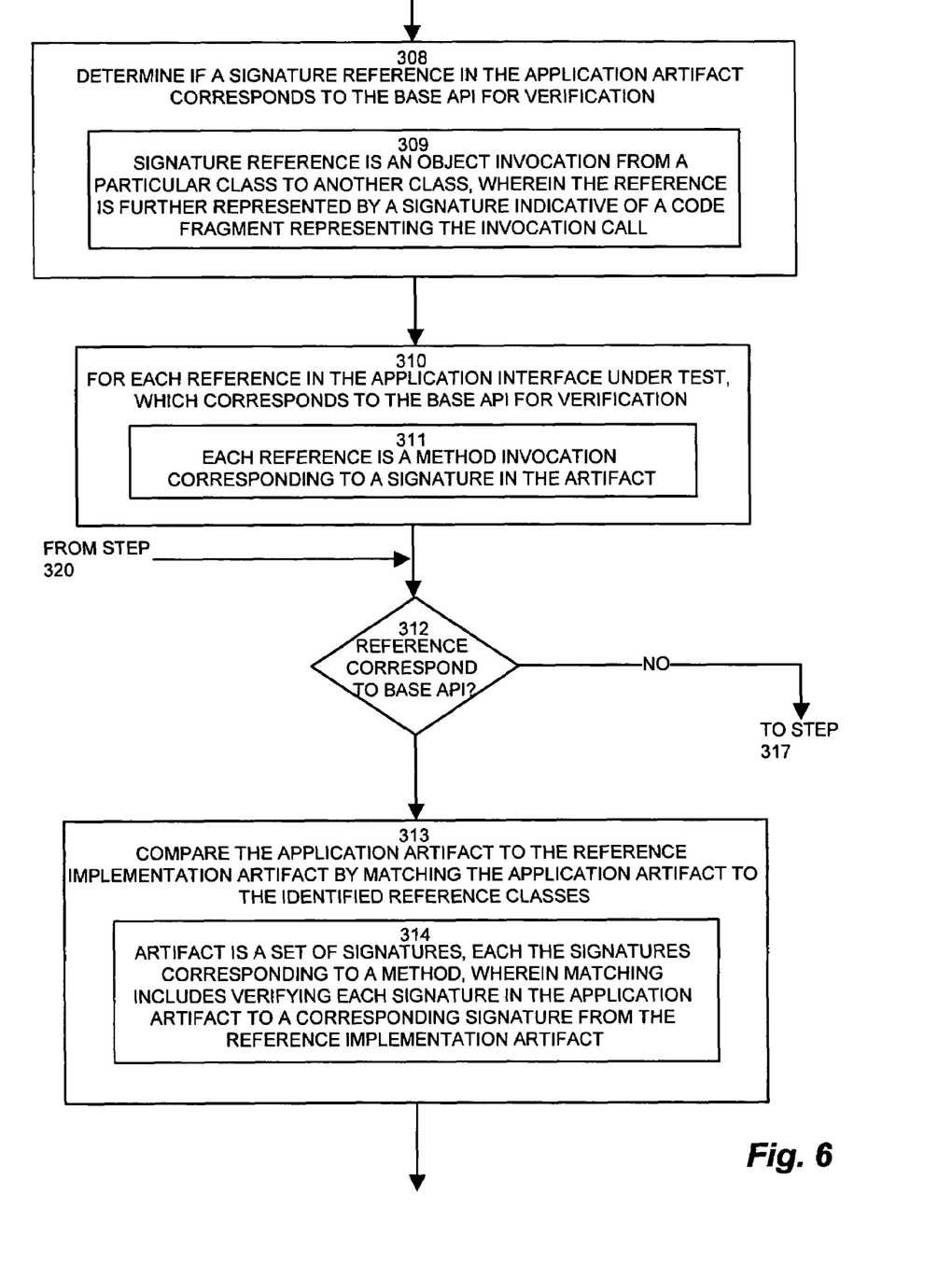
Figure 7:
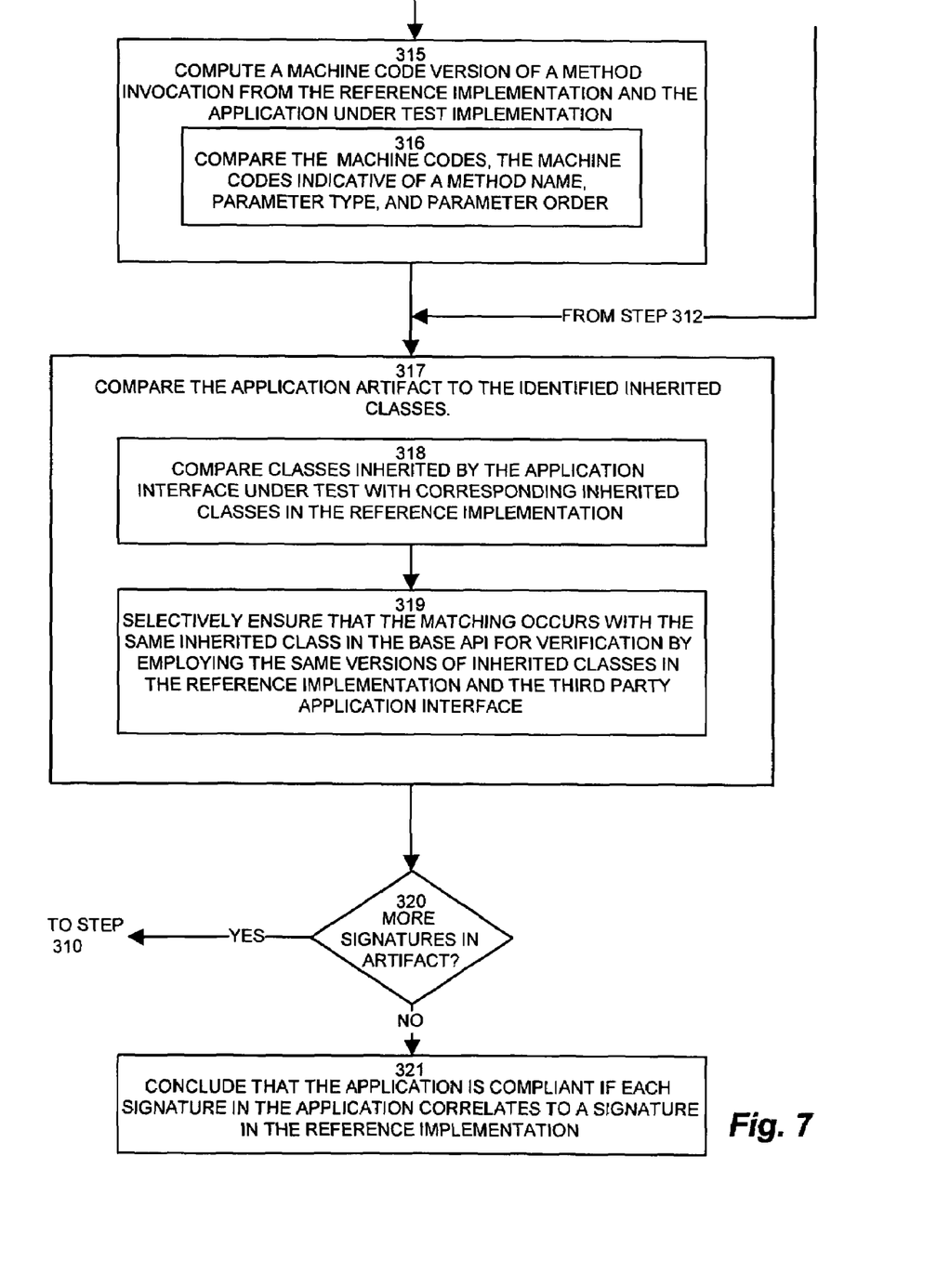

FIGS. 5-7 are a flowchart of operation of the verification tool 110 of FIG. 1 in greater detail. Referring to FIGS. 3-7, the verification tool 110 begins verifying an application under test 150 for compliance by employing the parser 122 to identify classes 142 corresponding to the reference implementation 140, in which the classes 152-N are adapted for inheritance relationships with other classes 152-N, as shown at step 300. The parser 122 further identifies reference classes, or test classes 188, from the identified classes 152 indicative of a base API for verification, in which the base API is deterministic of a compliant third party interface, and the remaining identified classes denote inherited classes 182. Therefore, the reference implementation 140 includes code consisting of a set of classes 142-1 . . . 142-N. The set of all classes 142-1 . . . 142-N includes the test classes 188, such as the J2EE classes, which are the subject of the compliance test, and inherited classes 182, which are inherited or included by the J2EE classes but which are not a subject of the test and which do not impact the compliant/non-compliant determination 180. Accordingly, the class loader hierarchy 126 loads the test classes 188 and the inherited classes 182 accordingly to generate the reference implementation artifact 160 representing the classes 142' and including signatures 143-1 . . . 143-N (143, generally) of both the test classes 188 and the inherited classes 182, of the reference implementation of the interface, as depicted at step 302.

Accordingly, generating the reference implementation artifact 160 and the application artifact 170 further includes defining a reference inheritance chain, shown by arrow 190, from the reference implementation 140, as shown at step 303, indicative of inherited classes 182. The inheritance chain 190 identifies successive versions of inherited classes 182, such as, for example different versions of the J2SE API 146-2, 146-3, and ensures that the reference implementation artifact 160 employs the SE implementation 156-2 employed by the application under test 150, as shown at step 304. The class loader hierarchy 126 employs the system/inherited class loader 129 to ensure that both the reference implementation artifact 160 and the AUT artifact 170 employ the same inherited classes, via arrow 190, rather than the reference implementation 140 employing alternate versions or revisions 146-N shown by dotted arrows 184.

The signature generator 120 then generates the application artifact 170 indicative of an application under test (AUT)150, as depicted at step 305. The application artifact 170, therefore, represents the corresponding classes 152'. The application under test artifact 170 also defines a AUT reference chain 190, wherein the reference inheritance chain from step and the AUT reference chain include corresponding classes in the inheritance chain, as depicted at step 306. Accordingly, the inheritance chain, illustrated by line 190, identifies successive versions of inherited classes 182 employed by both the application under test 150 and the reference implementation 140 and codified, respectively, in the application under test artifact 170 and the reference implementation artifact 160, as depicted at step 307.

In the exemplary configuration discussed herein, the generated artifacts 160, 170 are signatures 143-1 . . . 143-N, 153-1 . . . 153-N corresponding to each reference to a method, and include the name of the invoked method and the parameters and types expected. In a particular configuration, the signature represents the entry point, or method call, made by the invoking code. One or more methods comprises a class of methods 142-N, 152-N, which in turn define particular APIs 146-N, 156-N, each API including one or more classes. Accordingly, using the application under test artifact 170, the signature verifier 130 determines, for each signature 153-N in the artifact 170, if a signature reference in the application artifact 170 corresponds to the reference implementation 140 test classes 188 for verification, as depicted at step 308. Such a signature reference is an object, or method, invocation from a particular class 152-N to another class 152-N, in which the reference is further represented by a signature indicative of a code fragment representing the invocation call, as disclosed at step 309.

As indicated above, the artifacts 160, 170 are generated using the same version of the inherited classes 182, and test class 188 versions of the application under test 150. Therefore, comparing the signatures further includes, for each reference in the application interface under test 170, identifying if the reference corresponds to the reference implementation 140 test classes 188 (i.e. base API) for verification, as depicted at step 310, in which each reference is a method invocation corresponding to a signature 143 (i.e. signature reference) in the artifact 160, as shown at step 311. Accordingly, when a class reference corresponds to the test classes 188 of the reference implementation 140, as depicted by the test at step 312, the signature verifier 130 compares the application artifact 170 to the reference implementation artifact 160 by matching the application artifact 170 to the identified reference classes 188 in the reference implementation artifact 160, as depicted at step 313. As indicated above, the compared artifact 160 is a set of signatures, in which each of the signatures corresponds to a method. Matching includes verifying each signature 153-N in the application artifact 160 to a corresponding signature 143-N from the reference implementation artifact 160, as shown at step 314.

In particular configurations, comparing signatures may further include computing an alternate object or machine code version of a method invocation from the reference implementation 140 and the application under test 150, as shown at step 315, and comparing the resulting codes, in which the codes are also indicative of a method name, parameter type, and parameter order, as depicted at step 316. Such alternate codes or encoding mechanisms may facilitate comparison and/or indexing of the signatures representative of the APIs.

If an application under test 170 reference corresponds to an inherited class at step 312, then the signature verifier 130 compares the signature 153 in the application artifact 170 to the identified inherited classes 142' in the reference implementation artifact 160, as depicted at step 317. Comparing, therefore, further includes comparing classes 152' inherited by the application interface under test artifact 170 with corresponding inherited classes 142' in the reference implementation artifact 160, as shown at step 318. Since the test classes 142' and 152' and signatures 143, 153 have been loaded by the class loader hierarchy 126 to selectively insure that the matching occurs with the same inherited class 182 in the base API for verification, the signature verifier 130 employs the same versions of inherited classes in the reference implementation 140 and the application under test 150 (e.g. third party) application interface, as disclosed at step 319. The signature verifier then checks if there are more signatures 153 in the application artifact 170, as depicted at step 320, and control reverts to step 310 accordingly. The verification tool then concludes that the application 150 is compliant if each signature 153 in the application artifact 170 correlates to a signature 143 in the reference implementation artifact 160, as shown at step 321.

Those skilled in the art should readily appreciate that the programs and methods for test suite class inheritance to verify application interface compliance as defined herein are deliverable to a processing device in many forms, including but not limited to a) information permanently stored on non-writeable storage media such as ROM devices and b) information alterably stored on writeable storage media such as floppy disks, magnetic tapes, CDs, RAM devices, and other magnetic and optical media. The operations and methods may be implemented in a software executable object. Alternatively, the operations and methods disclosed herein maybe embodied in whole or in part using hardware components, such as Application Specific Integrated Circuits (ASICs), state machines, controllers or other hardware components or devices, or a combination of hardware, software, and firmware components.

While the system and method for verifying application interface compliance has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for verifying application interface compliance comprising:

identifying classes corresponding to a reference implementation, the classes adapted for inheritance relationships with other classes;

identifying inheritance classes from the identified classes indicative of a base API for verification, the base API deterministic of a compliant third party interface;

generating a reference implementation artifact indicative of the base API and inheritance relationships;

electronically generating an application artifact indicative of a third party application interface under test (AUT); and determining if a signature reference in the application artifact corresponds to the base API for verification and, if so:

comparing the application artifact to the reference implementation artifact by matching the signature reference in the application artifact to signature references of the identified inheritance classes in the reference implementation artifact.

2. The method of claim 1 wherein comparing further comprises comparing, if the signature reference in the application artifact does not correspond to the base API for verification, comparing classes inherited by the application interface under test with corresponding inherited classes in the reference implementation.

3. The method of claim 2 wherein the signature reference is an object invocation from a particular class to another class, wherein the signature reference is represented by a signature indicative of a code fragment representing the invocation call.

4. The method of claim 3 wherein the artifact is a set of signatures, each of the signatures corresponding to a method, wherein matching includes verifying each signature in the application artifact to a corresponding signature from the reference implementation artifact.

5. The method of claim 4 further comprising concluding that the application is compliant if each signature in the application correlates to a signature in the reference implementation.

6. The method of claim 5 wherein generating the reference implementation artifact and the application artifact further comprises:
defining a reference inheritance chain from the reference implementation; and
defining an AUT reference chain, wherein the reference inheritance chain and the AUT reference chain include corresponding classes in the inheritance chain.

7. The method of claim 6 wherein the inheritance chain identifies successive versions of inherited classes.

8. The method of claim 7 further comprising employing the same versions of inherited classes in the reference implementation and the third party application interface.

9. The method of claim 1 wherein comparing further comprises:
for each reference in the application interface under test, identifying if the reference corresponds to the base API for verification; and
selectively ensuring that the matching occurs with the same inherited class in the base API for verification.

10. The method of claim 9 wherein each reference is a method invocation corresponding to a signature in the artifact.

11. The method of claim 10 wherein comparing signatures further comprises
computing a machine code version of a method invocation from the reference implementation and the application under test implementation; and
comparing the machine codes, the machine codes indicative of a method name, parameter type, and parameter order.

12. A method for test suite class inheritance comprising:
generating a set of signatures corresponding to an application under test, the signatures indicative of class invocations by the application under test;
identifying a set of test classes corresponding to the classes under test;
identifying a set of inherited classes corresponding to classes inherited by the classes under test;
determining, for each class in the application under test, if the class corresponds to the classes under test or the inherited classes;
electronically generating a set of reference implementation signatures, generating further comprising, for each class in the application under test:
building, if the class corresponds to the classes under test, the reference implementation signature of the class from the test classes; and
building, if the class corresponds to inherited classes, the reference implementation signature from the same inherited class as the application under test; and
comparing the signatures corresponding to the API under test to the signatures of the reference implementation.

13. The method of claim 12 wherein the class invocations are references to the class operable for execution, each of the references operable to invoke a particular method.

14. A system for validating an application program to verifying application interface compliance comprising:
one or more computers including
a verification tool operable to identify classes corresponding to a reference implementation, the classes adapted for inheritance relationships with other classes, and further operable to identify inheritance classes from the identified classes indicative of a base API for verification, the base API deterministic of a compliant third party interface, the remaining identified classes being inherited classes;
a signature generator in the verification tool operable to generate a reference implementation artifact indicative of the reference implementation of an interface, the signature generator further operable to generate an application artifact indicative of a third party application interface under test (AUT);
a custom class loader operable to determine if a signature reference in the application artifact corresponds to the base API for verification; and
a signature verifier operable to, if the signature reference in the application artifact corresponds to the base API for verification, compare the application artifact to the reference implementation artifact by matching the application artifact to the identified inheritance classes, and if not, operable to compare the application artifact to the identified inherited classes.

15. The system of claim 14 wherein the signature generator is further operable to compare classes inherited by the application interface under test with corresponding inherited classes in the reference implementation.

16. The system of claim 15 wherein the signature reference is an object invocation from a particular class to another class, wherein the signature reference is represented by a signature indicative of a code fragment representing the invocation call.

17. The system of claim 16 wherein the signature generator is further operable to generate an artifact including a set of signatures, each of the signatures corresponding to a method, wherein matching includes verifying each signature in the application artifact to a corresponding signature from the reference implementation artifact.

18. The system of claim 17 wherein the signature verifier is operable to conclude that the application is compliant if each signature in the application correlates to a signature in the reference implementation.

19. The system of claim 18 wherein the signature generator is further operable to:
define a reference inheritance chain from the reference implementation; and
define an AUT reference chain, wherein the reference inheritance chain and the AUT reference chain include corresponding classes in the inheritance chain.

20. The system of claim 19 wherein the inheritance chain identifies successive versions of inherited classes.

21. The system of claim 20 wherein the signature generator employs the same versions of inherited classes in the reference implementation and the third party application interface.

22. The system of claim 14 wherein the verification tool is further operable to:
for each reference in the application interface under test, identify if the reference corresponds to the base API for verification; and
selectively ensure that the matching occurs with the same inherited class in the base API for verification.

23. The system of claim 22 wherein each reference is a method invocation corresponding to a signature in the artifact.

24. The system of claim 23 wherein the signature generator is further operable to:
compute a machine code version of a method invocation from the reference implementation and the application under test implementation; and
compare the machine codes, the machine codes indicative of a method name, parameter type, and a parameter order.

25. A computer program product having a computer readable medium operable to store computer program logic embodied in computer program code encoded thereon for verifying application interface compliance comprising:
computer program code for identifying classes corresponding to a reference implementation, the classes adapted for inheritance relationships with other classes;
computer program code for identifying inheritance classes from the identified classes indicative of a base API for verification, the base API deterministic of a compliant third party interface;
computer program code for generating electronically a reference implementation artifact indicative of the reference implementation of an interface;
computer program code for generating an application artifact indicative of a third party application interface under test (AUT); and
computer program code for determining if a signature reference in the application artifact corresponds to the base API for verification and, if so:
computer program code for selectively comparing the application artifact to the reference implementation artifact by matching the signature reference in the application artifact to signature references of the identified inheritance classes in the reference implementation artifact.

26. A test suite executing on a processor for verifying application interface compliance comprising:
means for identifying classes corresponding to a reference implementation, the classes adapted for inheritance relationships with other classes;
means for identifying inheritance classes from the identified classes indicative of a base API for verification, the base API deterministic of a compliant third party interface;
means for generating a reference implementation artifact indicative of the reference implementation of an interface;
means for generating an application artifact indicative of a third party application interface under test (AUT); and
means for determining if a signature reference in the application artifact corresponds to the base API for verification and, if so:
means for selectively comparing the application artifact to the reference implementation artifact by matching the signature reference in the application artifact to signature references of the identified inheritance classes in the reference implementation artifact.

27. The method of claim 1 further comprising:
accumulating API calls in the application interface under test (AUT) for which no corresponding reference is found;
identifying a set of reference in the application interface under test; and
resolving the accumulated API calls by comparing the accumulated API calls to the references in the application under test.

28. The method of claim 27 further comprising identifying, in the application interface under test, a main application class, the main application class operable to invoke references in other classes in the application interface under test.

29. The method of claim 28 wherein the main application class is operable to directly or indirectly invoke each of the other classes in the application interface under test, and determining the existence of a corresponding reference further comprises traversing indirect invocations emanating from the main application class.

30. A method for auditing compliance with an application interface comprising:
identifying a main application class corresponding to an application under test, the main class inclusive of a plurality of classes corresponding to the application under test;
identifying a reference set of valid API references, the API references indicative of references performable by calls from the application under test;
determining, for each reference from the main application class, whether a corresponding API reference exists in the reference set;
storing electronically, if the reference is not identified in the reference set of valid calls, the reference in as an unresolved reference;
traversing each of the unresolved references against the plurality of classes in the application under test, traversing further including indirect references to the main application class and plurality of classes included therein;
resolving, if the traversing indicates a corresponding reference in the main application class, the unresolved reference; and
denoting, if no corresponding references is indicated by the traversing, the reference as an unresolved.

31. The method of claim 30 wherein the reference set of valid AP references verification is a data store of successive revisions of a predetermined API interface.

32. The method of claim 31 wherein the successive revisions are a Java 2 Standard Edition (J2SE) and a Java 2 Enterprise Edition (J2EE) signature set.

* * * * *